(No Model.) 2 Sheets—Sheet 1.

G. SHILLING & C. G. SMITH.
APPARATUS FOR MOISTENING AND COOLING THE ATMOSPHERE OF ROOMS.

No. 494,494. Patented Mar. 28, 1893.

Witness
Louis S. Julihn.
Eric G. Julihn.

Inventors
Geo. Shilling.
C. G. Smith.
By, Hopkins &c.
Attorneys (No Model.) 2 Sheets—Sheet 2.

G. SHILLING & C. G. SMITH.
APPARATUS FOR MOISTENING AND COOLING THE ATMOSPHERE OF ROOMS.

No. 494,494. Patented Mar. 28, 1893.

Witness
Louis T. Julihn
Eric G. Julihn

Inventors
Geo. Shilling
C. G. Smith
By Hopkins & Hopkins
Attorneys

UNITED STATES PATENT OFFICE.

GEORGE SHILLING AND CHARLES G. SMITH, OF WASHINGTON, DISTRICT OF COLUMBIA.

APPARATUS FOR MOISTENING AND COOLING THE ATMOSPHERE OF ROOMS.

SPECIFICATION forming part of Letters Patent No. 494,494, dated March 28, 1893.

Application filed November 11, 1891. Serial No. 411,620. (No model.)

*To all whom it may concern:*

Be it known that we, GEORGE SHILLING and CHARLES G. SMITH, of Washington, in the District of Columbia, have invented a new and useful Apparatus for Moistening, Purifying, and Cooling the Atmosphere of a Room, of which the following is a specification, reference being had to the accompanying drawings.

The object of our invention is to produce a simple and inexpensive device for purifying and moistening air of artificially heated rooms, or of cooling rooms in hot weather.

Figure 1:
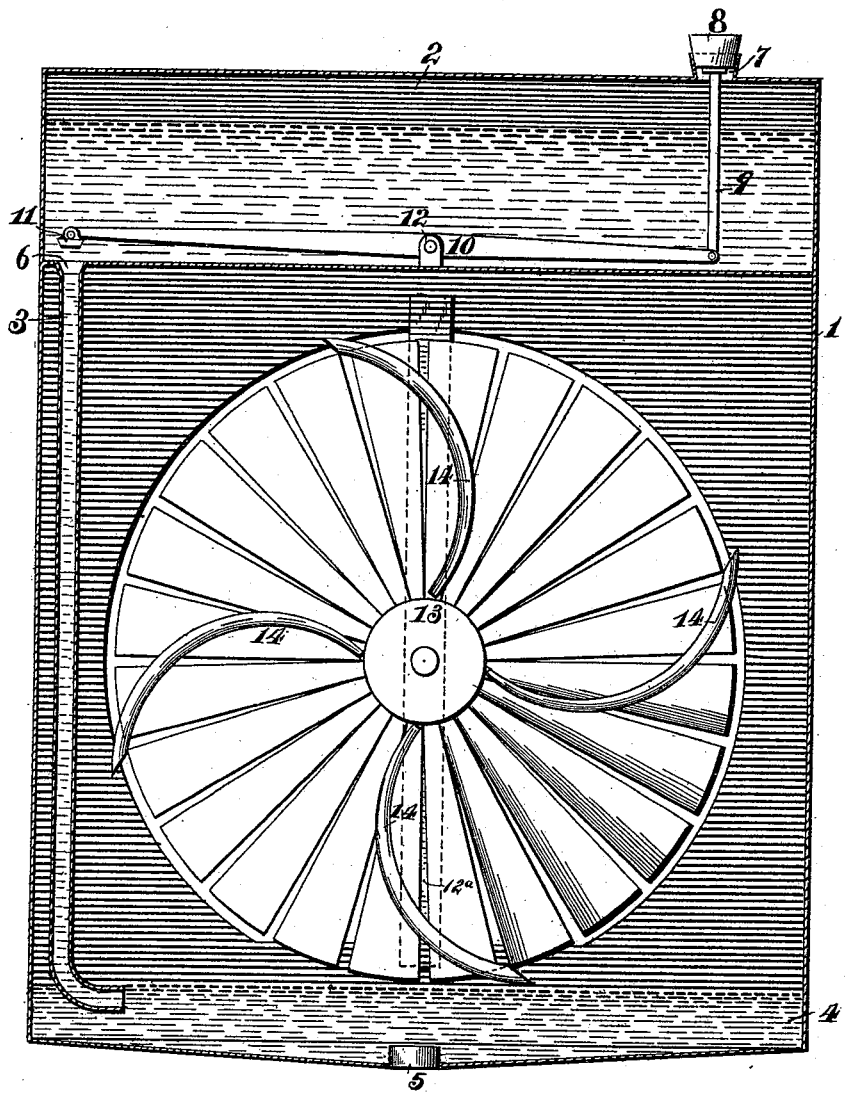
Figure 2:
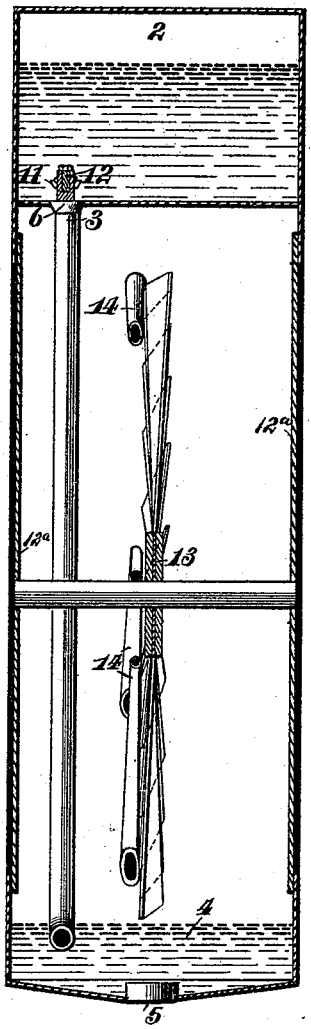
Figure 3:
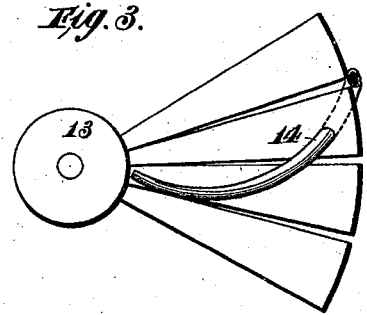
Figure 4:
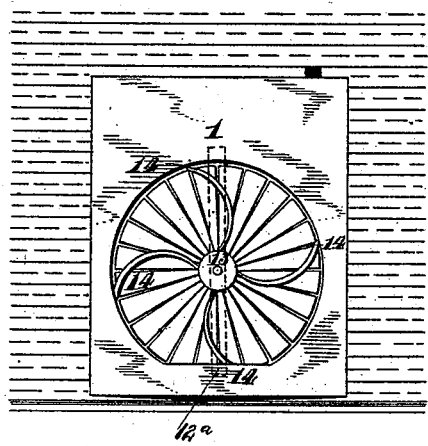

In the accompanying drawings, Figure 1 is a central vertical longitudinal section of our apparatus. Fig. 2 is a central vertical section, taken at right angles to the view shown in Fig. 1. Fig. 3 shows a portion of a wheel by which our apparatus may be adapted to be used in a horizontal position. In that figure a conduit is shown as extending from the lower side of the wheel upward, and terminating near the center of the wheel on the upper side. The conduit opens on the side of the wheel instead of on its periphery, as shown on the other figures of the drawings. Fig. 4 is a front elevation of our apparatus in place in a wall.

Referring to the figures on the drawings, 1 indicates a frame. It may be of oblong shape, as illustrated in the drawings, and may be adapted to take the place of an ordinary furnace register, or to sit in an open window or other suitable place. Its form is not a material part of our invention. In the top of this frame, for convenience, we locate an upper reservoir, 2, that communicates through a pipe 3 with a lower reservoir 4 preferably having a converging bottom and cork or stopper 5. When the upper reservoir is filled with water and closed tightly, after the water in the lower reservoir has covered the discharge opening of the pipe 3, the liquid, in accordance with a well known law, will remain stationary until the level of water in the lower reservoir is reduced so as to allow the passage of air through the pipe, when sufficient water from the upper reservoir will be allowed to flow into the lower to again raise the level of water in the latter high enough to restore the equilibrium. Ordinarily, however, if the upper reservoir were unstopped, for the purpose of refilling it, for instance, any residuum of water would be discharged into the lower reservoir and might overflow it. To obviate this difficulty, therefore, we have provided in the top of the pipe 3 a valve seat 6, and in the top of the reservoir an opening 7 for receiving a cork or stopper 8. To the bottom of this cork we fasten a stem 9 that is pivoted to the lever 10 which carries pivotally on its opposite end a valve 11. The lever 10 is provided with a fulcrum 12. The relative adjustments of these parts are such that when the cork 8 is withdrawn, the valve 11 is closed to prevent leakage of water through the pipe 3. But when the cork is replaced the pipe 3 is opened and water is allowed to pass through it, as above explained.

Within the open space, between the upper and lower reservoirs, as illustrated in Figs. 1, 2, and 4 of the drawings, is mounted in suitable bearings, 12$^a$ a wheel 13, whose periphery is adjusted to come almost into contact with the surface of the water in the lower reservoir. At intervals, upon this wheel, are fastened conduits 14. These are preferably curved and tapered tubes having their outer ends cut off at angles to leave broad openings toward the direction in which the wheel should move. When the wheel is rotated rapidly, the outer ends of these tubes projecting preferably beyond the periphery of the wheel, are successively plunged and drawn through the water in the lower reservoir. Each time a portion of the liquid is forced through one of the tubes, and by the continued rotation of the wheel, is ejected from the end of the tube nearer the center of the wheel. That end being ordinarily smaller than the other causes the water to issue in a fine jet, which may be broken up and diffused by striking on the side of the wheel.

Any suitable means may be employed for rotating the wheel but for ordinary purposes we prefer to employ as the wheel which carries the tubes one which may be moved without additional mechanism, as for instance a wind wheel, which may be caused to revolve by the passage through it of the current of air which it is desired to moisten or cool. The ordinary form of wind-wheel carries oblique blades and the sides of these blades are well adapted to break up the jets of water as they are discharged from the small ends of the tubes against them. This construction is the simplest and neatest for the purpose, and requires no attention to keep it running properly. When this form is employed the apparatus may be placed across the end of a heating pipe to take the place of a register, and the current of hot air will be automatically moistened and purified by passing through it. The water will catch the particles of dust or soot which might otherwise be carried up through the pipes, and will precipitate them in the lower reservoir, which may be cleansed by drawing off the water and accumulations through the cock 5 located in the lowest point of the converging bottom.

When employed for cooling the atmosphere of a room, the apparatus may be placed in a window or inclosed opening, and its operation will be the same as when used as a register of a furnace.

For cooling purposes any suitable cooling liquid may be employed. If, for instance, iced water is used a separate auxiliary reservoir or tank connected with the reservoir 2 may obviously be employed.

What we claim is—

1. The combination with a reservoir adapted to contain a liquid, of a revoluble wheel and curved tubes thereon, open at both ends, and extending from near the axial center of said wheel toward the periphery thereof, so that their outer ends will dip into and elevate the water as the wheel is rotated, substantially as specified.

2. The combination with a reservoir and wheel having inclined blades, and curved tubes, the latter open at both ends and extending from near the center toward the periphery of the wheel, so as to discharge the water taken up against obstructions as the blades and spray or disintegrate the same, substantially as specified.

3. The combination with the wheel, of the curved tubes extending from near the axial center of the wheel toward the periphery thereof, and tapered or contracted toward their inner ends, as they approach the axial center of the wheel, whereby water is taken up as the wheel is rotated and discharged in jets near its axial center, substantially as specified.

In testimony of all which we have hereunto subscribed our names.

GEORGE SHILLING.
CHARLES G. SMITH.

Witnesses:
JAS. A. TAIT,
JOHN N. EHLE.